Inventors:
Heinz Hermes
Wolfgang Völkner
BY Spencer & Kaye
Attorneys

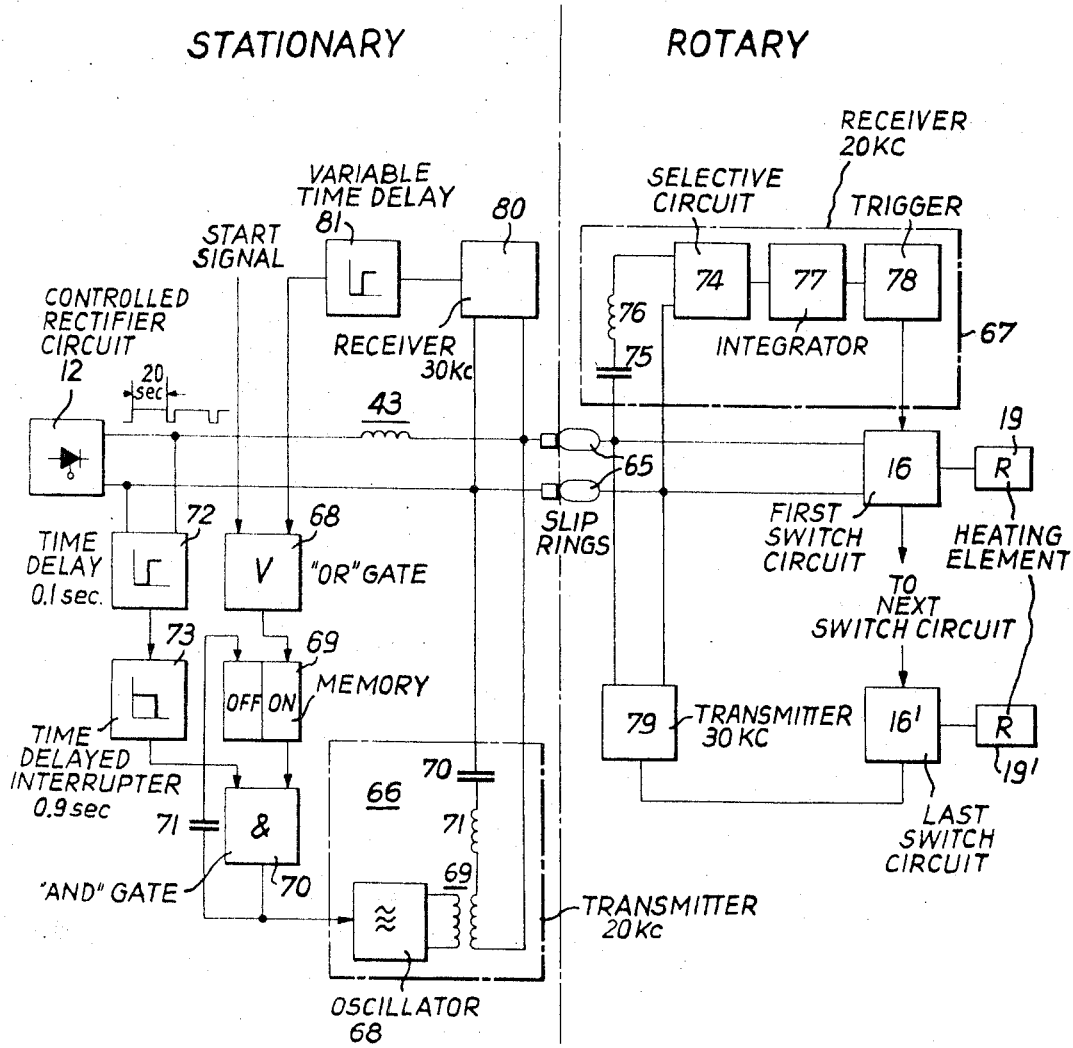

United States Patent Office 3,453,415
Patented July 1, 1969

3,453,415
AIRCRAFT DEICING SYSTEM
Heinz Hermes, Hamburg, and Wolfgang Volkner, Wedel, Germany, assignors to Licentia Patent-Verwaltungs-G.m.b.H., Frankfurt am Main, Germany
Filed Apr. 27, 1967, Ser. No. 634,385
Claims priority, application Germany, Apr. 28, 1966, L 53,448
Int. Cl. H05b 3/02
U.S. Cl. 219—486                    19 Claims

ABSTRACT OF THE DISCLOSURE

A plurality of electrical heating elements are mounted adjacent to an aircraft surface to be deiced, a source of pulsating direct current is provided for energizing the heating elements, and a switching circuit is provided for applying the output pulses of the pulsating direct current source to the heating elements one at a time in sequence. The switching circuit includes a plurality of controlled semiconductor rectifiers each coupled between the source of pulsating direct current and a corresponding heating element, with trigger input and output circuits for firing the rectifiers one at a time in sequence, each of the rectifiers being conductive after firing for a time period equal to the pulse width of the pulsating direct current source. An automatic disconnecting circuit is provided to disconnect the heating elements from the source of pulsating direct current when any of the heating elements become short circuited.

Background of the invention

This invention relates to a deicing system for aircraft in which the heat required for deicing the engine, wing and empennage systems is generated in electrical heating elements which are alternatingly connected in a fixed sequence to the elctrical system of aircraft by means of a switching circuit.

A number of methods have been used in the past for deicing aircraft. There are chemical, exhaust-gas-thermal, pneumatic, and electrical systems for protecting the wings, empennage, air intake openings of the engines, propellers, propeller spinners and other aircraft surface areas from icing up, or to deice iced areas. In the known electrical deicing methods, the heating resistors which are disposed in so-called heating mats on the areas to be deiced are not all heated simultaneously, rather only one heating mat at a time is supplied in cyclic sequence with a high heat output for a short time.

A deicing unit is known in which the individual heating mats are connected to an A.C. alternator via a stepping switch and a central relay. The central relay is synchronized by a timing pulse generator so that its on-period corresponds to the time period during which one heating mat is being heated. The stepping switch is actuated at the same time intervals so that only one heating mat is connected to the A.C. alternator at any one time.

The above-described prior art deicing system, however, has several serious disadvantages. Each heating mat must have its own input lead which is necessarily relatively large in cross-sectional area. The large cross-sectional area is required because a large portion of the alternator output current flows to one heating mat at a time. Because of the number and thickness of the required leads, the deicing unit has an undesirably heavy weight when used on larger aircraft, which is a serious disadvantage. Moreover, each lead has to be provided with a fuse, which leads to a further increase in weight for the unit. Furthermore, the stepping switch and central relay cause radio interference.

A deicing unit is also known in which, for example, an A.C. trunk line is provided for the wing section of the aircraft, with only individual branch lines leading to the heating mats, where each branch line contains an A.C. relay and a thermal fuse. The relays are switched by one or a plurality of stepping switches in such a manner that only one heating mat is energized at any one time. This deicing system, however, has the disadvantages that the relays are subject to wear and that the unit must be serviced after each flight. Furthermore, it is not possible without great expenditure of time and effort to detect and eliminate in due time short-circuits in the heating elements caused by flying stones or the like. Thus it often happens that the heating mats burn out in this prior art deicing system.

Another disadvantage of the above-noted prior art systems is that the operation of the stepping switches requires synchronous motors, and these synchronous motors require a fixed frequency A.C. input in order to maintain constant heating periods. Moreover, it is very difficult to change the length of the heating period when synchronous motors are used. This can only be done by great technical effort, with the aid of variable speed motors, for example, or by means of variable gear or friction drives.

It has been proposed to eliminate the electrical switches of the above-described prior art deicing systems by replacing the relays with controllable semiconductor rectifiers. However, six thyristors would be required for each three-phase relay in order to provide the required disconnectability for each A.C. heating mat. This, however, would involve unjustifiably complex circuitry. Furthermore, the application of such a system or the above-mentioned prior art systems to the deicing of helicopters would involve great difficulties. To transfer the heating power and the control signals from the stationary part of the helicopter to the rotors, a large number of slip rings would be required.

Summary of the invention

It is the object of this invention to provide an aircraft deicing unit which eliminates the above-mentioned disadvantages and which is applicable with equal advantage for rotary-wing as well as to fixed wing aircraft. The deicing system of this invention includes:

(1) a plurality of electrical heating elements mounted adjacent to an aircraft surface to be deiced; (2) a source of pulsating direct current for energizing the heating elements; (3) a plurality of normally open electrical switching circuits each coupled in series between the source of pulsating direct current and a corresponding one of the heating elements; and (4) trigger input and output circuits for closing the normally open electrical switching circuits one at a time in sequence for a time period equal to the pulse width of the pulsating direct current source.

With the aid of the periodically pulsating direct current, the switching circuits are controlled in such a manner that at any given time only one heating element is energized during each D.C. pulse. At the end of each D.C. pulse, the switching circiut which was closed is opened, and a trigger output is applied to the next switching circuit in the sequence to close the next switch during the next D.C. pulse. By varying the pulse width of the D.C. pulses, the heating period and thus the final temperature of the heating elements can be controlled to avoid building up a thick layer of ice that might damage the aircraft by colliding with another part of the airframe after it has been melted free of the deicer surface.

In one embodiment of the invention for aircraft that utilize three-phase electrical power systems, the pulsating direct current is generated by a controlled rectifier bridge circuit which is controlled by a pulse generator which is adjustable in its pulse frequency.

According to the invention, it is further proposed to utilize controlled semiconductor rectifiers as switching elements. Controlled semiconductor rectifiers are advantageous because they are subject to vary little wear since they do not involve mechanical contacts.

*Brief description of the drawings*

FIGURE 6 is a block diagram of another embodiment of the invention.

*Description of the preferred embodiments*

Figure 1:
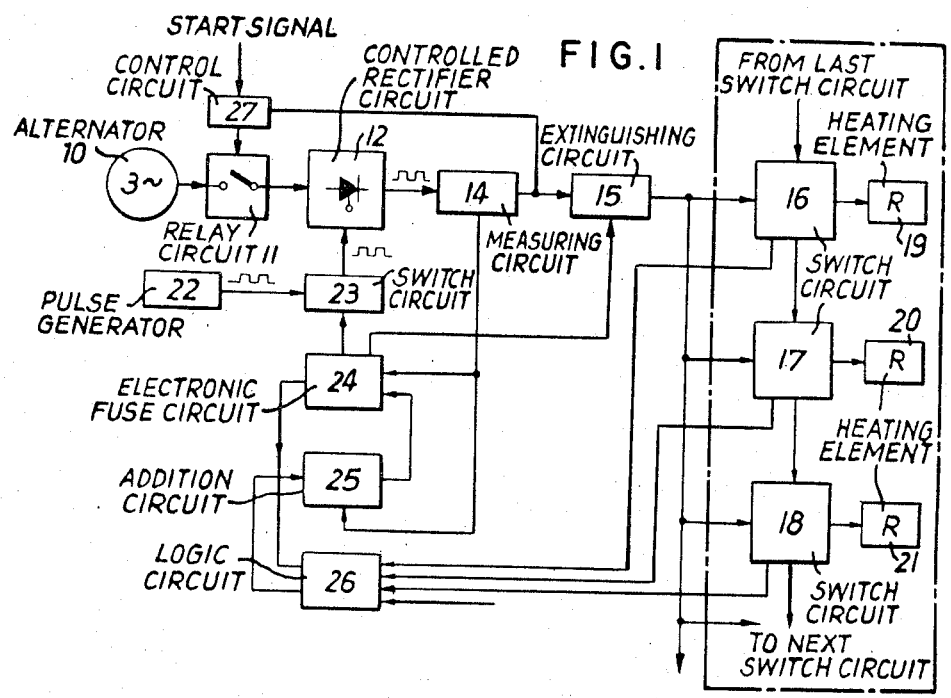
FIGURE 1 is a block diagram of one illustrative embodiment of the invention.

Before describing the disclosed embodiments in detail, several specific proposals of this invention will first be discussed. When controlled semiconductor rectifiers are used as switching elements, it is further proposed, according to this invention, that the trigger input and output for the switching circuits should include: (1) a resistor-capacitor charging circuit coupled in parallel with each heating element, including a capacitor, a charging resistor connected in series with the capacitor, and a discharging resistor connected in series with the capacitor; (2) a diode connected in parallel with the charging resistor and poled in the opposite direction to the charging current, whereby the capacitor discharge occurs via the diode and the disconnected heating element; and (3) a D.C. ignition circuit to supply all controlled semiconductor rectifiers with ignition pulses, the ignition circuit being coupled to the control electrode of each controlled rectifier through a four-layer diode which is coupled to the discharge circuit of the preceding controlled rectifier so as to be fired thereby, whereby the capacitor discharge connects the ignition circuit to the control electrode of the next controlled rectifier.

During the heating period of a heating element, the capacitor connected in parallel thereto is charged. When the D.C. pulse reaches zero, the controlled semiconductor rectifier therefor is extinguished and the capacitor discharges through the diode and the heating element. An increase in voltage occurs between the capacitor and the discharge resistor, which is added to the voltage of the ignition circuit, whereby the four-layer diode, which is connected between the capacitor and the discharge resistor, fires and connects the ignition circuit to the control electrode of the next controlled rectifier. A four-layer diode is not absolutely necessary to connect the ignition pulse to the next controlled semiconductor rectifier. Any type of switching element which becomes conductive above a certain voltage level can be used. An inductance can also be used as the charging element instead of a condenser.

The D.C. voltage for the ignition circuit is preferably supplied by a capacitor which is charged from the pulsating D.C. source via a rectifier. Only one capacitor need be provided for any desired number of switching elements, since the switching elements are ignited one at a time. The capacity of this capacitor, however, must be selected so that it will retain a sufficient charge in the time interval between two D.C. pulses. The capacitor is continuously recharged from the pulsating direct current source.

A single ignition generator can also be used which continuously and in synchronism with the pulsating direct current source provides the individual switching elements with ignition pulses.

According to the invention, it is further proposed that an automatic disconnecting circuit be utilized to disconnect the heating elements if they become short-circuited or open-circuited by collision with stones or the like. This disconnecting circuit can comprise a switching circuit for the controlled rectifier bridge circuit and an extinguishing circuit which includes an inductance connected in series with one of the output leads of the pulsating D.C. source and a countervoltage source connected in parallel with the inductance. When a short circuit occurs, it is necessary to disconnect the energized heating element as quickly as possible. The heating element would extinguish by itself at the end of a D.C. pulse, but since the pulse width generally covers 10 to 30 seconds, if it is not possible to disconnect the short circuit before this time, the components of the deicing system might be destroyed by the overload. Moreover, since the arcing due to the short circuit creates a fire hazard, it is essential to disconnect the energized heating element in the shortest possible time. Accordingly, immediately after the controlled rectifier bridge circuit is blocked, the voltage of the countervoltage source is connected to the inductance to apply an extinguishing voltage pulse to the controlled semiconductor rectifiers in the switching circuits and in the controlled rectifier bridge circuit to immediately interrupt the current in the circuit. Moreover, this rapid extinguishing action is achieved without the use of heavy cathode chokes such as required to perform the same function in prior art deicing systems.

The countervoltage source for the extinguishing circuit can comprise a charged capacitor which is switched in parallel with the inductance by means of a controlled semiconductor rectifier. The capacitor is charged to a voltage higher than the voltage of the pulsating D.C. source, and is connected across the inductance when the corresponding controlled semiconductor rectifier is triggered.

To avoid kick-back voltages when the current through the inductance is interrupted, a damping circuit comprising a diode and a resistor in series with each other can be connected in parallel with the inductance.

In case of a malfunction, the deicing unit is first disconnected so that the defective heating element can be removed from the heating cycle. After the unit is again connected, the remaining heating elements are again supplied with energy. This, however, results in an increase of the mean value of the heat output for the heating elements remaining in operation. This increase can be so considerable that it might cause the heating mats to burn out. Means must be provided, therefore, to maintain the mean value of the heat output constant in spite of missing heating elements. This is done, according to a further proposal of the invention, by providing a dummy load circuit for each heating element, which dummy load circuit simulates the corresponding heating element and switching circuit and which can be connected as a substitute for these circuit elements in case of a malfunction.

When a central ignition generator is used, these dummy load circuits are not required. It is then only necessary to disconnect the defective heating element and its associated components. The heating elements disposed in the heating mats are of different sizes and therefore have a quite varied output. In order to accurately initiate the disconnecting action even at the slightest malfunction, it is not sufficient to measure only the output current of the pulsating D.C. source, since this current will vary in normal operation due to the variation in the size of the heating elements. This invention therefore proposes an additional circuit in which a proportional correction value is added to the measured value of the pulsating D.C. current to form a current level indication which is corrected for variations of current due to variation in the size of the heating elements. The disconnecting circuit is then actuated when this corrected current level indication varies from a predetermined nominal value.

To each heating element, a correction value proportional to the appropriate heating current is added during the heating cycle. With the aid of a logic circuit, it can be determined which correction value corresponds to the heating element presently in operation. This logic circuit is then also able to detect which heating element is defective, since the defective heating element must necessarily be the heating element which is in operation when a short circuit is detected.

The length of a heating period for the heating elements depends on the pulse width of the pulsating direct current. To protect the heating elements from overheating, it is proposed, according to the invention, to provide a special protective circuit to monitor the pulse width in the pulsating direct current circuit. When deviations from the normal pulse width occur, this protective circuit actuates the disconnecting circuit.

The generator which provides the prime power for the deicer system of this invention may also supply power to other units in the aircraft. These other units generally place an asymmetrical load on the generator in contrast to the symmetrical load created by the deicing unit. As is known, it is required that with an asymmetrical load, the star point of a three-phase generator must be connected to the primary framework of the aircraft. For such a case, it is further proposed for the deicing unit according to this invention, that a switching element is provided in front of and behind each heating element. The second switching element is required only for safety reasons, since otherwise a short-circuit to ground, for example, could not be disconnected.

For a deicing unit whose generator is connected to the framework of the aircraft at its star point, a separate extinguishing circuit is preferably provided in both output leads of the pulsating D.C. source. With the aid of these extinguishing circuits, the deicing unit can be disconnected in the shortest possible time in case of malfunction. To detect such a malfunction accurately and quickly, a corrected current level indication is preferably generated for each one of the two conductors of the pulsating D.C. source. It is also possible, in such circumstances, to detect a short circuit to ground by measuring the difference of current between the two output conductors of the pulsating D.C. source.

Deicing the rotors of helicopters entails certain difficulties, because electrical energy and switching signals must be transmitted from the stationary part of the helicopter to the rotors. Previously a great number of slip rings were required for this transmission. The present invention is particularly well suited for deicing rotary-wing aircraft. In helicopter applications, it is proposed that the switching circuits and control circuits associated with the heating elements be disposed on the rotor hub, that the rectifier bridge circuit be disposed in the stationary part of the helicopter, and that two slip rings be disposed on the rotor hub to connect the rectifier bridge circuit with the switching components in the rotor hub. This circuit has the great advantage that only two slip rings are required between the stationary part of the helicopter and the rotors.

The protective and disconnecting devices for the deicing of helicopters are similar to those for the deicing of fixed-wing aircraft. A dummy load circuit to replace a defective heating element in case of malfunction is not required, however. If, for example, one heating mat on the rotor is eliminated because of a short-circuit, the entire deicing unit must be disconnected, since the rotor area not being deiced would throw the rotor off balance and would destroy it in a very short time.

For deicing the rotating stabilizer on the helicopter, the heating element disposed on the stabilizer of the helicopter can be fed via two slip rings, one of which is connected to one conductor on the stationary portion of the pulsating D.C. source while the other is connected, via a third slip ring on the main rotor, to the other conductor on the rotating portion of the pulsating direct current circuit. The control circuit for this heating element on the stabilizer is also disposed on the main rotor hub.

In the deicing unit of this invention, the ignition voltage for the first controlled semiconductor rectifier is initially supplied from an external voltage source. In the case of helicopter deicing, it is proposed that initial ignition pulses and other signals be transmitted between the stationary and the rotating portion of the helicopter by means of additive heterodyning. In this case, a transmitter and a receiver are associated with the stationary as well as the rotating portion of the helicopter, whereby the initial ignition pulses and, if required, other signals as well can be transmitted via the two slip rings on the rotor hub between the rotating and the stationary portion of the helicopter by means of additive heterodyning.

The preferred embodiment of the invention will now be described with reference to the drawings. Referring to FIGURE 1, a three-phase alternator 10 supplies A.C. power to a controlled rectifier bridge circuit 12 through a relay switching circuit 11 which is controlled by a control circuit 27. The relay switching circuit 11 is closed by a signal from the control circuit 27 to apply power to the deicing system and is opened by a signal from the control circuit 27 to remove the power from the deicing system. Heating elements 19, 20 and 21 are connected to rectifier bridge circuit 12 via switching circuits 16, 17 and 18, and also via an extinguishing circuit 15 and a measuring circuit 14. A pulse generator 22 controls the rectifier bridge circuit 12 via a switching circuit 23 to produce a pulsating direct current output from rectifier bridge circuit 12. The rectifier switching circuit 23 normally connects the output of pulse generator 22 to rectifier bridge circuit 12, but switching circuit 23 can be opened by the electronic fuse circuit 24 when a short circuit is detected by means of the input signals from measuring circuit 14, addition circuit 25, and logic circuit 26, whose detailed operation will be explained later.

The pulse width of the pulsating direct current output from rectifier circuit 12, which can be adjusted by varying the pulse width of pulse generator 22, and which generally is between 10 and 30 seconds in length, determines the heating time for each heating element. Only one heating element is connected to the rectifier circuit 12 via the corresponding switching element during one direct current pulse. For example, the first direct current pulse is applied to heating element 19 via switching circuit 16. At the end of the first direct current pulse, the switching circuit 16 opens and produces, through a trigger output circuit which is not further indicated in FIGURE 1, a trigger signal to the following switching circuit 17, which then connects its heating element 20 to the rectifier circuit 12 for the period of one pulse width. In this way, any number of heating elements can be energized in the cycle. When the deicing system is initially energized, the trigger pulse for the first switching circuit 16 in the cycle is generated by power control circuit 27. The trigger output from the last switching circuit in the sequence is connected back to the input of switching circuit 16 so that the heating cycle will be continuously repeated.

In case of a short-circuit, and also for short circuits to ground which can result from collision with stones, rain erosion, or the like, the pulsating direct current source must be disconnected from the heating elements as quickly as possible. This is accomplished by means of measuring circuit 14, electronic fuse circuit 24, extinguishing circuit 15, addition circuit 25, and logic circuit 26. Measuring circuit 14 produces an output signal which is proportional to the current flowing therethrough, and this signal is applied to addition circuit 25 along with a correction signal from logic circuit 26. Logic circuit 26 receives input signals from each of the switching circuits and generates a current correction signal depending on which heating element is switched on, thereby compensating for different sizes of the heating elements. The output of addition circuit 25 is thus constant under normal conditions, in spite of the differences of current between the heating elements, except when there is a short circuit or other circuit malfunction. When the output signal of addition circuit 25 deviates from its predetermined normal value, electronic fuse circuit 24 is triggered, which in turn opens the switches in rectifier switching circuit 23 and extinguishing circuit 15, thus reducing the current in the circuit to zero.

In case of malfunction, the defective switching elements or heating elements are replaced by a dummy load circuit, not shown in the drawings, which simulates the defective heating element and its associated switching circuit. One such dummy load circuit is provided for each of the heating elements and their switching circuits. With the aid of the logic circuit 26, it is determined which heating element is defective, and this heating element is replaced by the appropriate dummy circuit by means of a switching circuit which is also not shown in the drawings. This is done to keep the mean value of the total heat output the same in spite of a reduction in number of heating elements so that the heating elements do not become overheated.

Figure 2:
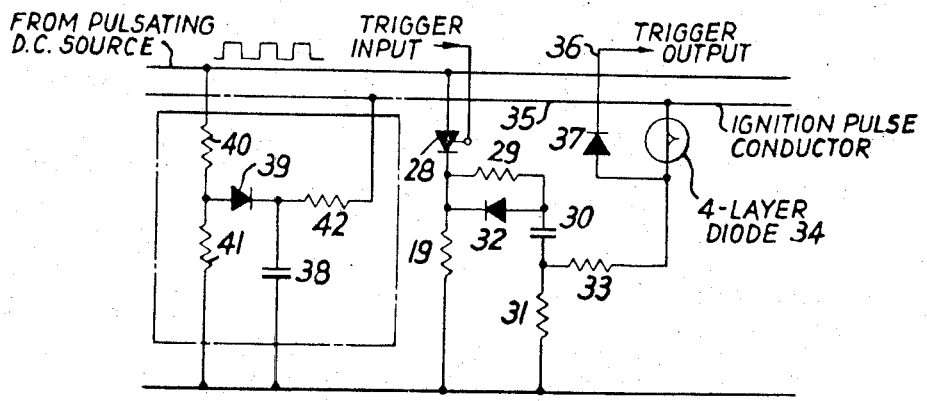
FIGURE 2 is a schematic circuit diagram of one suitable trigger input and output circuit for the embodiment shown in FIGURE 1.

Each switching element 16, 17 and 18 contains at least one controllable semiconductor rectifier, i.e., a thyristor or silicon controlled rectifier. Each one of the controlled semiconductor rectifiers has an associated trigger input and output circuit, which forms a part of the switching circuits 16, 17 and 18, and which provides an ignition pulse for the next controlled semiconductor rectifier in the sequence when it is extinguished. FIGURE 2 shows a schematic circuit diagram of the trigger input and output circuit for switching circuit 16.

The heating element 19 is connected in series with a controlled semiconductor rectifier 28 to the source of pulsating D.C. A charging circuit is connected in parallel with the heating element 19, consisting of a charging resistor 29 and a capacitor 30. A discharge resistor 31 is further connected in series with resistor 29 and capacitor 30. A diode 32 is connected in parallel with the charging resistor 29 and is poled to conduct in the opposite direction of the charging current for capacitor 30. Between capacitor 30 and discharge resistor 31, a series connection leads from a resistor 33 to one terminal of a four-layer diode 34, whose other terminal is connected to an ignition pulse conductor 35. Between resistor 33 and four-layer diode 34, a diode 37 and conductor 36 are coupled. Conductor 36 leads to the control electrode of the next semiconductor rectifier in the heating cycle, i.e., to the semiconductor rectifier in switching circuit 17. Voltage is applied to the ignition pulse conductor 35 by a capacitor 38, which is charged through a diode 39 and two charging resistors 40 and 41 from the source of pulsating direct current. A further resistor 42 is connected between the condenser 38 and the ignition pulse conductor 35.

During the time period that controlled semiconductor rectifier 28 is switched on, the capacitor 30 is being charged. At the end of one direct current pulse, the controlled semiconductor rectifier 28 blocks, and the capacitor 30 discharges through the diode 32 and the heating element 19. When diode 32 begins to conduct, the potential between the capacitor 30 and the resistor 31 changes, and this change is added to the voltage already applied to the four-layer diode 34 by ignition pulse conductor 35, thus causing the four-layer diode 34 to ignite. The condenser 38 can now discharge through the four-layer diode 34 and the diode 37 to apply an ignition pulse to the next controlled semiconductor rectifier. The capacitor 38 can be used for any desired number of heating elements, since it is only connected to one switching circuit at a time. The capacity of capacitor 38 must be selected so that it is capable of retaining its charge in the time interval between two pulses, which is generally several milliseconds in length.

Figure 3:
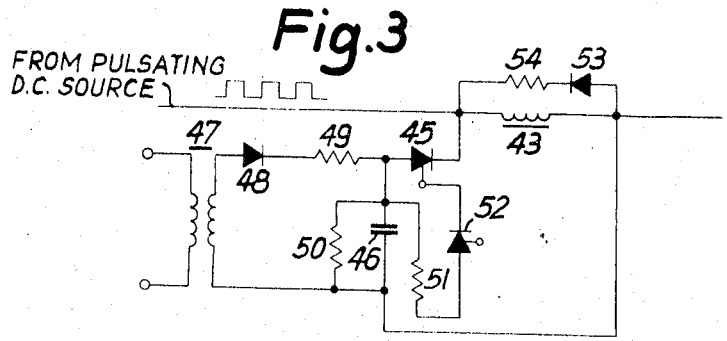
FIGURE 3 is a schematic circuit diagram of one suitable automatic disconnecting circuit for the embodiment shown in FIGURE 1.

FIGURE 3 shows a schematic circuit diagram for the extinguishing circuit 15 of FIGURE 1. A choke 43 is connected in series with one of the two conductors of pulsating direct current. A countervoltage source is connected in parallel with the choke 43, the countervoltage source comprising a capacitor 46 which is coupled in series with a controllable semiconductor rectifier 45. The capacitor 46 is charged by a transformer 47 via a diode 48 and a resistor 49 to a voltage which is substantially higher than the voltage of the pulsating D.C. source. A large resistor 50 is connected in parallel with the capacitor 46. Between the resistor 49 and the capacitor 46, a series circuit containing a resistor 51 and another controlled semiconductor rectifier 52 is coupled to the control electrode of the controlled semiconductor rectifier 45. To damp kick-back voltages which occur when current in the choke 43 is terminated, a diode 53 and resistor 54 are connected in parallel with choke 43.

When a short-circuit occurs, the signal from the electronic fuse 24 is applied to the control electrode of the controlled sesiconductor rectifier 52, which fires and couples capacitor 46 to the control electrode of controlled semiconductor rectifier 45, which fires and applies the voltage of capacitor 46 to choke 43. Even if, because of a short-circuit, the entire voltage of the pulsating D.C. source is applied to choke 43, the short-circuit current is immediately extinguished by the higher voltage of the capacitor 46. It is possible, with the aid of this extinguishing circuit, to disconnect a short-circuit within a few microseconds.

Figure 4:
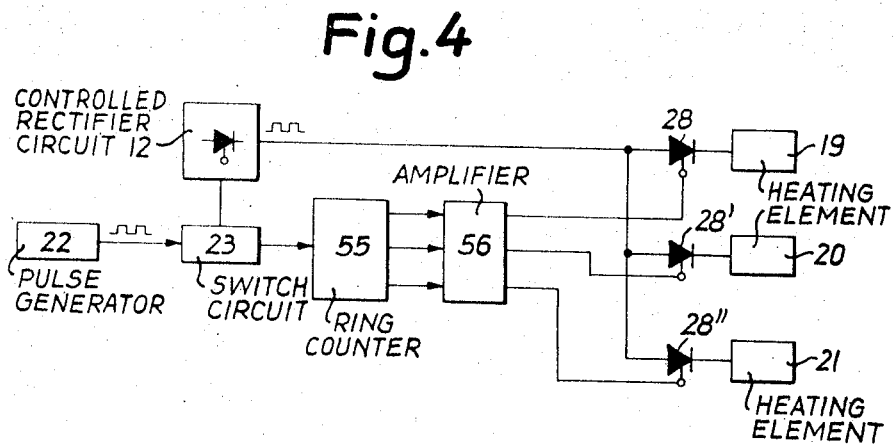
FIGURE 4 is a block diagram of a switch circuit suitable to replace switch circuits shown in FIGURE 1.

FIGURE 4 shows another switch circuit suitable to replace the switch circuits 16, 17, 18 shown in FIGURE 1. Heating elements 19, 20, 21 are connected to rectifier bridge circuit 12 via controlled semiconductor rectifiers 28, 28', 28". Pulse generator 22 controls the rectifier bridge circuit 12 via the switching circuit 23 to produce a pulsating direct current output from rectifier bridge circuit 12. Switch circuit 23 is also connected to a ring counter 55 the outputs of which are activated successively, and cyclically in synchronism with the pulses delivered by pulse generator 22. Those outputs being coupled to the control electrodes of controlled semiconductor rectifiers 19, 20, 21 via an amplifier 56, the controlled semiconductor rectifiers 28, 28', 28" are fired successively so that the heating elements 19, 20, 21 are energized in the cycle for the period of one pulse width each.

Figure 5:
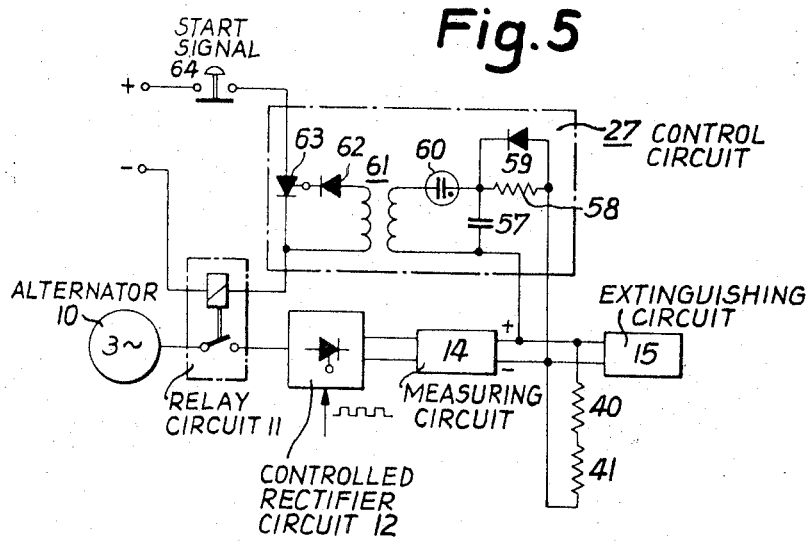
FIGURE 5 is a schematic circuit suitable for monitoring the pulse width of the output of a source of pulsating direct current for the embodiment shown in FIGURE 1.

FIGURE 5 shows an illustrative example of control circuit 27 suitable for monitoring the pulse width of the output of controlled rectifier bridge circuit 12 as applied in FIGURE 1. Here again, alternator 10 supplies A.C. power to controlled rectifier circuit 12 through a relay switching circuit 11, and the controlled rectifier circuit 12 is followed by measuring circuit 14, and extinguishing circuit 15.

For the period of one pulse width, a capacitor 57 is charged via the resistor 58. Hence, the peak voltage of capacitor 57 is proportional to the pulse width of the output of controlled rectifier circuit 12. At the end of a pulse, capacitor 57 is discharged via the diode 59, and resistors contained in further devices of the embodiment such as resistors 40, 41. If the peak voltage of capacitor 57 surpasses a predetermined security level corresponding to the maximum permissible pulse width, then a glow discharge lamp 60 fires. The resulting current produces a voltage peak at the output of a transformer 61, which is coupled to the control electrode of a controlled semiconductor rectifier 63 via a further diode 62. Controlled semiconductor rectifier 63 connects relay circuit 11 to a suitable direct current source not shown so that relay circuit 11 interrupts the connection between alternator 10, and controlled rectifier circuit 12. To reset relay circuit 11 after such an interruption, a push button 64 must be depressed as a start signal which causes relay circuit 11 to close again.

FIGURE 6 shows another embodiment of the invention particularly designed for use on helicopters, the switch circuits 16, 16' and heating elements 19, 19' disposed on the main rotor of the helicopter being energized via two slip rings 65. The stationary controlled rectifier bridge circuit 12 produces a pulsating direct current output with a pulse width of 20 seconds, and feeds the slip rings 65 via choke 43.

Contrary to the embodiment shown in FIGURE 1, the trigger output from the last switch circuit 16', is not connected back to the input of first switch circuit 16 so that in order to repeat a heating cycle, an ignition signal must be transmitted to switch circuit 16. This is done by means of additive heterodyning, a signal generated by a transmitter 66, with a frequency of 20 kilocycles, being additionally transmitted via the slip rings 65 to a receiver 67, of the same frequency. Transmitter 66 contains an oscillator 68 feeding a transformer 69 which is coupled to the output line of controlled rectifier circuit 12 via a series resonator tuned to the frequency of 20 kilocycles, and consisting of a capacitor 70, and an inductance 71. Choke 43 keeps the frequency of transmitter 66 from disturbing controlled rectifier circuit 12.

To start a heating cycle, a start signal from an external voltage source is applied to transmitter 66 via an "OR" gate 68, a memory 69, and an "AND" gate 70. To avoid unwanted repetition, the output of "AND" gate 70 is connected back to memory 69 via a capacitor 71. By means of the "AND" gate 70, three conditions for the beginning of a heating cycle are introduced. First, the heating cycle can not start during the interval between two pulses of the output D.C. of controlled rectifier circuit 12. Secondly, the cycle must not start exactly at the beginning of a pulse because the transmitted ignition signal cannot be properly distinguished from disturbing frequencies constituted by the steep front rise of a pulse. In the third place, the on-time of the first heating element 19 should approximately equal the period of one pulse width, which is 20 seconds, as is true for all other heating elements 19'. An appropriate timing of .1 second relative to the front rise of the pulses is reached by means of a time delay 72, while an interrupter 73 delayed by .9 second, and connected to the input of "AND" gate 70, enforces the third condition by making sure that ignition signals cannot be passed from memory 69 to transmitter 66 but within the first second after the beginning of a pulse.

An initial ignition signal from transmitter 66 is detected by a selective circuit 74 of receiver 67, which is coupled to slip rings 65 via a series resonator 75, 76 similar to series resonator 70, 71. In order to eliminate possible false signals resulting from the front rise of D.C. pulses the detected 20 kc. waves are rectified, and integrated over several periods by an integrator 77 connected to a trigger 78. When the output of integrator 77 reaches a level corresponding to several sucessive 20 kc. waves, trigger 78 passes the ignition signal to the first switch circuit 16 which provides an ignition pulse for the next switch circuit in the sequence when it is extinguished.

The trigger output pulses of the last switch circuit 16' is re-transmitted to the stationary part of the embodiment by means of a transmitter 79, and a receiver 80, both of which operate at a frequency of 30 kilocycles, and which may be of the type of transmitter 66 and receiver 67, respectively. Receiver 80 is connected to the input of "OR" gate 68 via a variable time delay 81 which may, for instance, be set at 80 seconds, and which comprises a memory which is only extinguished after the signal received from receiver 80 has been passed on. In this way, the output signal of receiver 80 serves as a new igniiton signal after a time determined by variable time delay 81, upon which the heating cycle recommeces.

Suitable circuits for electronic fuse circuit 24 can be found in "Semiconductor Catalogue AR 142," which was published December 1965 by SGS-Fairchild, and suitable circuits for logic circuit 26 can be found on pages 125 to 137 of "Transistor Manual," 5th edition, by General Electric.

It will be understood that the above description of the present invention is susceptible to various modifications, changes, and adaptations, and the same are intended to be comprehended within the meaning and range of equivalents of the appended claims.

We claim:
1. An aircraft deicing system for preventing the formation of ice on an aircraft by heating a surface thereof, comprising, in combination:
   (a) a plurality of electrical heating elements each mounted adjacent to the aircraft surface to be deiced;
   (b) a source of pulsating direct current;
   (c) a plurality of normally open electrical switching circuits each coupled in series between said source of pulsating direct current and a corresponding one of said electrical heating elements, each of said electrical switching circuits including trigger input means for switching the circuit into its closed state for a time period equal to the pulse width of said source of pulsating direct current in response to an input trigger signal, and each of said electrical switching circuits including trigger output means for generating a trigger output signal when the circuit switches back to its open state; and
   (d) means coupling said electrical switching circuits together in sequence with the trigger output means of each switching circuit being coupled to the trigger input means of the next switching circuit to form a stepping switch circuit for applying the output pulses of said source of pulsating direct current to said heating elements one at a time in sequence.

2. A deicing system as defined in claim 1 wherein the aircraft contains a three-phase electrical power system, and wherein said source of pulsating D.C. comprises a controlled rectifier bridge circuit energized by said three-phase electrical power system.

3. A deicing system as defined in claim 1 wherein each of said normally open electrical switching circuits includes a controlled semiconductor rectifier switching element.

4. A deicing system as defined in claim 3 wherein said trigger input and output means for each of said electrical switching circuits comprises:
   (1) a charging resistor, a charging capacitor, and a discharge resistor connected in series with each other and the series circuit formed thereby being connected in parallel with the corresponding heating element;
   (2) a diode connected in parallel with said charging resistor, said diode being poled to conduct in the opposite direction of the charging current for said capacitor, whereby said capacitor discharges through said diode, said heating element, and said discharge resistor; and
   (3) a direct voltage ignition circuit coupled through a plurality of four-layer diodes to the ignition contact of each of said controlled semiconductor rectifiers, each of said four-layer diodes being coupled to the junction of the preceding charging capacitor and discharge resistor to be fired when the preceding discharge capacitor discharges, thereby connecting said direct voltage ignition circuit to the ignition contact of the corresponding controlled semiconductor rectifier.

5. A deicing system as defined in claim 1 wherein a single ignition generator is coupled to all of said switching circuits, said ignition generator being operable to apply ignition pulses to each of said switching circuits in sequence in synchronism with the D.C. pulse output of said pulsating D.C. source.

6. A deicing system as defined in claim 4 wherein said direct voltage ignition circuit is fed by a capacitor which is charged by the pulsating D.C. source via a rectifier.

7. A deicing system as defined in claim 1 and further comprising a disconnecting circuit including a switch circuit for de-energizing said source of pulsating direct current, and an extinguishing circuit comprising a choke coupled in series with said pulsating direct current source, and a countervoltage source connected in parallel with said choke, and electronic fuse circuit means for triggering said switch circuit and said extinguishing circuit when the current flow through said heating elements exceeds a predetermined nominal level.

8. A deicing system as defined in claim 7 wherein said countervoltage source comprises a capacitor and a controlled semiconductor rectifier connected in series with each other, the series circuit being connected in parallel with said choke, and means connected in parallel with the capacitor for charging the capacitor.

9. A deicing system as defined in claim 8 and further comprising a diode and a resistor connected in series with each other, the series circuit being connected in parallel with said choke for damping the inductive kick-back voltage of the choke.

10. A deicing system as defined in claim 1 and further comprising a plurality of dummy load circuits each simulating a corresponding heating element and its associated switching circuit, and means for connecting each dummy load circuit in place of the corresponding heating element and its associated switching circuit in the event of a malfunction therein.

11. A deicing system as defined in claim 7 and further comprising a current measuring circuit coupled in series with the output of said source of pulsating direct current, means for generating a correction current corresponding to the nominal current for each of said heating elements, means for adding together the output of said current measuring circuit and said means for generating said correction current to form a current level indication which is corrected for variations of current due to variations in the size of the heating elements, and means for actuating said electronic fuse circuit when said current level indication exceeds a predetermined value.

12. A deicing system as defined in claim 1 and further comprising means for monitoring the pulse width of the output of said source of pulsating direct current.

13. A deicing system as defined in claim 2 wherein said three-phase electrical power system is connected to the primary framework of the aircraft, and wherein two switching circuits are provided for each heating element, one of said switching circuits being coupled in series with the heating element on one side thereof, and the other switching circuit being coupled in series with the heating element on the other side thereof.

14. A deicing system as defined in claim 7 wherein two extinguishing circuits are provided, one of said extinguishing circuits being connected in series with one output conductor of said source of pulsating direct current and the other extinguishing circuit being connected in series with the other output conductor of said source of pulsating direct current.

15. A deicing system as defined in claim 11 wherein said corrected current level indication is formed for each one of the two output conductors of said source of pulsating direct current.

16. A deicing system as defined in claim 13 and further comprising means coupled between the two output conductors of said source of pulsating direct current for detecting short circuits to ground.

17. A deicing system as defined in claim 1 for helicopters having heating elements mounted on the rotor blades thereof, wherein the switching circuits associated with the heating elements and the control circuits associated with the switching circuits are mounted on the helicopter rotor hub, and wherein the source of pulsating direct current is mounted on the stationary part of the helicopter, and wherein said source of pulsating direct current is coupled to said switching circuits, heating elements, and control circuits in the rotor hub via slip rings on the rotor hubs.

18. A deicing system as defined in claim 17 wherein a heating element is disposed on the stabilizer of the helicopter, and further comprising two slip rings on said stabilizer for feeding current to the heating element thereon, one of said slip rings being connected to one conductor of said source of pulsating direct current on the stationary portion of the helicopter while the other slip ring is connected, via a third slip ring on the main rotor hub, to the other conductor of said source of pulsating direct current on the rotating portion of the pulsating direct current circuit.

19. A deicing system as defined in claim 14 and further comprising additive heterodyning means for transmitting initial ignition pulses and other signals between the stationary and rotating portions of said helicopter via said pulsating D.C. circuit.

References Cited

UNITED STATES PATENTS

| 2,675,456 | 4/1954 | Cleminson et al. | 219—486 |
| 2,762,897 | 9/1956 | Vrodman et al. | 219—486 |

BERNARD A. GILHEANY, *Primary Examiner.*

F. E. BELL, *Assistant Examiner.*

U.S. Cl. X.R.

219—480